May 29, 1956

J. M. OLDHAM 2,747,246

TOBACCO TYING SHUTTLE

Filed Jan. 8, 1953

INVENTOR
J. M. OLDHAM

BY A. Yates Dowell

ATTORNEY

United States Patent Office 2,747,246
Patented May 29, 1956

2,747,246

TOBACCO TYING SHUTTLE

Jasper M. Oldham, Richmond, Va.

Application January 8, 1953, Serial No. 330,310

4 Claims. (Cl. 24—115)

This invention relates to agricultural implements and more particularly to equipment employed in the harvesting or handling of crops in order to facilitate such harvesting and handling.

Specifically the invention relates to a shuttle which can be used during the harvesting of tobacco in tying the leaves of the tobacco on a stick for facilitating the handling and transportation of the tobacco, including the placing of the tobacco in barns or other locations for curing, transporting the tobacco to storage quarters, or the like.

It has been customary in harvesting tobacco to detach the lower ripe leaves from the stalk and string such leaves on a stick so that a quantity of such leaves can be handled as a unit. The leaves have been attached to the sticks with cord or twine, which has been tedious and the friction has caused soreness or injury to the hands of the operator, and consequently retarded the work.

It is an object of the invention to overcome this difficulty by providing a hand tying device or shuttle of simple and inexpensive construction, by means of which the tying of leaves of tobacco to a stick is less tedious, can be done more rapidly, and can be continued indefinitely without injury to the hands of the operator.

Another object of the invention is to provide a shuttle by which the desired tension may be applied on twine used in tying tobacco or for other purposes, eliminating frictional rubbing of the operator's fingers or hand.

A further object of the invention is to provide a shuttle which can be easily retained in the hand, which can be easily threaded, in which the tension on the cord or twine can be readily adjusted.

Figure 1:
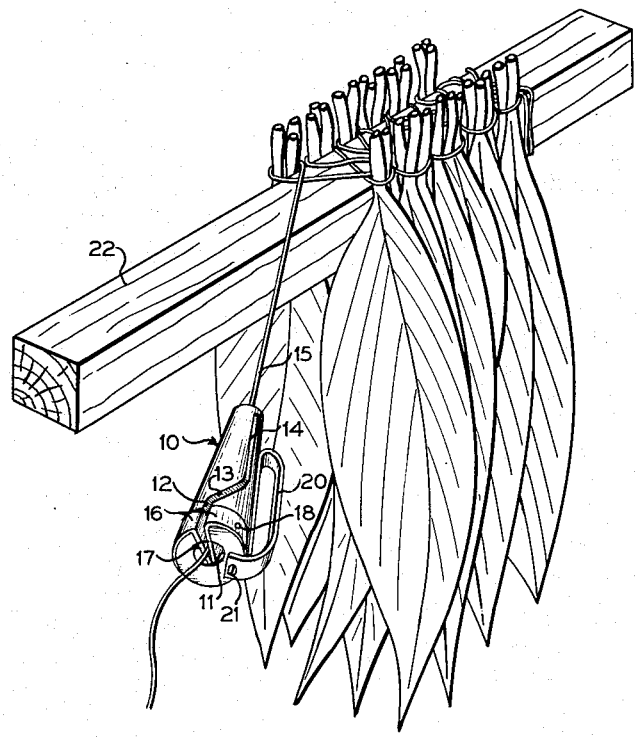
Figure 2:
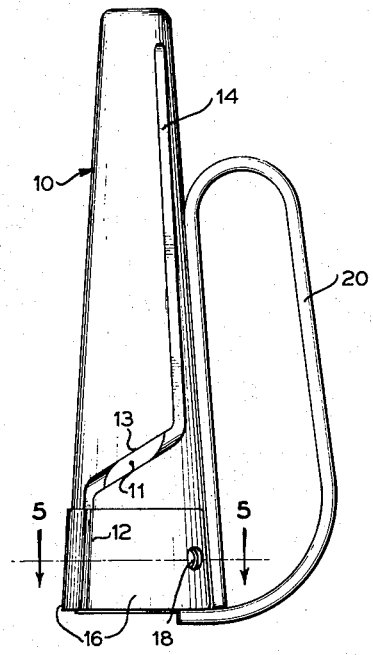
Figure 4:
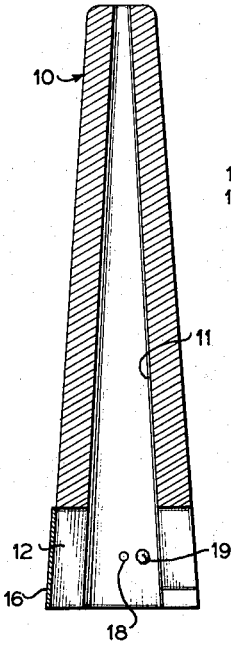
Figure 3:
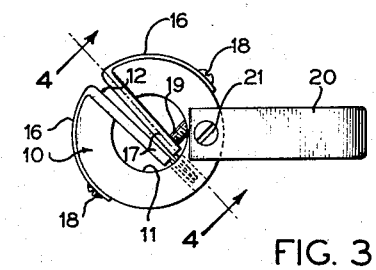

Further objects and advantages of the invention will be apparent from the following description taken in conjunction with the attached drawings, wherein:

Fig. 1 is a perspective illustrating one application of the invention and its method of use;

Fig. 2, a side elevation;

Fig. 3, a bottom plan view;

Fig. 4, a longitudinal section on the line 4—4 of Fig. 3; and

Figure 5:
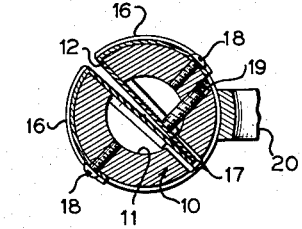

Fig. 5, a transverse section on the line 5—5 of Fig. 2.

Briefly stated the tobacco tying shuttle of the present invention comprises a hollow frusto-conical body having a relatively long axis. This body is preferably of aluminum, die-cast metal, plastic, or other relatively lightweight material which does not rust or corrode from exposure to dew or perspiration.

The body is provided with a relatively narrow cord or twine channel or slot which extends from its large end axially for a distance corresponding approximately to the diameter of such large end and then angularly, substantially 45°, for a substantially corresponding distance, and then axially to a point near the small or discharge end of the device. The threading eye is countersunk from the inside of the body to make threading easier.

In the axial portion of the slot at the large end of the device are mounted a pair of tension springs or members also of a substance which will not be corroded by moisture, and the edges of these springs are rolled over or rounded so that knots in the cord or twine may slip between or through adjacent portions of such springs without causing the breaking of the twine.

These springs are held in place by suitable screws or other fastening elements and adjustment of tension is provided in the form of an adjusting screw or other element which extends through the large end of the body into engagement with the ends of the tension springs so that by adjusting this screw the pressure or tension on the springs may be varied in accordance with requirements and to accommodate twine of different sizes.

A strap may be employed so that the shuttle may be easily retained within the hand by the operator during use, and a ball of twine may be conveniently carried in the pocket or in a container of any desired character during the use of the same in the tying of tobacco leaves on sticks or the like.

With continued reference to the drawing, the shuttle of the present invention comprises a hollow, frusto-conical body 10 having a bore 11 and a relatively long axis so that it will comfortably conform to the hand when it is being used. The body is preferably composed of aluminum, die-cast metal, plastic, or other relatively lightweight material that is not affected or caused to rust or corrode upon exposure to moisture from the hand of the operator or from dew from the tobacco.

The shuttle body 10 is provided with a relatively narrow cord or twine guiding channel extending from the large end of the shuttle to a point near the small end of the same in order to facilitate the twine passing through the body of the device. This slot has a pair of axial portions 12 and 14 connected by an intermediate angular portion 13. The axial portion 12 at the large end of the device is of a length substantially corresponding to the diameter of the body 10 and the axial portion 14 which terminates near the small end of the body is approximately four times the length of the other axial portion 12, the angular connecting portion 13 between the axial portions being of a length substantially corresponding to the length of the axial portion 12 and being disposed substantially at angles of 45° to such axial portions 12 and 14. In other words, the twine 15 can extend into the hollow frusto-conical member through its wall and can be easily threaded from the small end of the shuttle and in the direction from which it is moved during use.

In the axial portion 12 of the slot at the large end of the body are mounted a pair of tension springs or members including curved mounting portions 16, the curvature of which conforms to the external curvature of the body 10 and a pair of relatively straight portions 17 adapted to be disposed substantially diametrically of the body and with their ends in opposed relation to apply pressure on twine disposed therebetween. The tension springs are held in place by means of fastening elements 18 and are accordingly easily removed or applied, and the tension upon the springs can be varied by an adjusting screw or other element 19 which extends through the body 10 into engagement with the ends of the tension springs. By adjusting this screw the tension between the springs is variable in accordance with requirements and to accommodate twine of different sizes.

In order to facilitate the retention of the shuttle in the hand of the operator, a strap 20 is provided of fabric, a composition of rubber and cloth, or other substances, which preferably is moisture resistant and therefore will retain its flexibility although repeatedly wet from dew and perspiration. The strap may be attached by means of fastening elements 21.

The shuttle may be threaded by passing the twine axially through the same and between the straight portions 17 of the spring tension plates. The shuttle is grasped between the second, third and fourth fingers within the hand strap, the fourth finger around the smaller end of the shuttle as illustrated in Fig. 1. Twine is supplied from a ball which can be conveniently carried in the pocket of the operator or in a can, bucket, or other container conveniently located. Twine from the small end of the shuttle is tied to the end of a tobacco stick 22, then it is engaged over the alternate stems of tobacco in order to tie the tobacco on the stick. The twine travels through the shuttle from the large to the small end of the same. Tension on the twine is maintained by the tensioning springs and at the same time the shuttle can be moved along the twine as the latter is consumed, maintaining the hand and fingers of the operator out of contact with the twine, eliminating friction and rubbing on the hand and fingers of the operator, thereby avoiding blisters or injury thereto.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. A tobacco tying shuttle comprising a hollow substantially frusto-conical body having with regard to its transverse dimension a relatively long axis and a slot along such axis in its large end portion, a diagonal slot extending from the first slot, and a second axially slotted portion extending from the far end of the diagonally slotted portion, the hollow portion of said body forming a passage for twine, a pair of tension members having slightly spaced portions disposed inwardly of the first portion of said slot and having curved mounting portions conforming to the surface curvature of the large end of said body, fastening means for securing said tension members in position, adjusting means for varying the tension of said tension members so that twine disposed between the cooperating portions thereof will be gripped, the ends of said tensioning members being rolled to prevent cutting the twine, and a hand strap attached to said body by means of which the device may be retained in the hand of the user.

2. A tobacco trying shuttle comprising a hollow substantially frusto-conical body having with regard to its transverse dimension a relatively long axis and a slot to facilitate threading of said shuttle extending from its large end lengthwise of said body and terminating near its small end, the hollow portion of said body forming a passage for twine, said slot having relatively offset portions disposed axially of said body connected by an angular portion, tensioning members having twine gripping portions disposed in opposed relation adjacent the axis of said body for frictionally engaging the twine with which the body is threaded, the ends of such twine gripping portions being rolled to prevent cutting of the twine, means for varying the gripping pressure of said members on said twine.

3. A tobacco tying shuttle comprising a hollow substantially frusto-conical body having with regard to its transverse dimension a relatively long axis and a slot to facilitate threading of said shuttle extending from its large end lengthwise of said body and terminating near its small end, the hollow portion of said body forming a passage for twine, said slot having relatively offset portions disposed axially of said body connected by an angular portion, tensioning members having twine gripping portions disposed in opposed relation adjacent the axis of said body for frictionally engaging the twine with which the body is threaded, and means for varying the gripping pressure of said members on said twine.

4. A tobacco tying shuttle comprising a hollow substantially frusto-conical body having with regard to its transverse dimension a relatively long axis and a slot to facilitate threading of said shuttle extending from its large end lengthwise of said body and terminating near its small end, the hollow portion of said body forming a passage for twine, said slot having relatively offset portions disposed axially of said body connected by an angular portion, tensioning means for the twine with which the body is threaded, and means for varying the gripping pressure of said tensioning means on said twine.

References Cited in the file of this patent

UNITED STATES PATENTS

| Number | Name | Date |
|---|---|---|
| 34,397 | Lofvendahl | Feb. 11, 1862 |
| 337,852 | Meyers | Mar. 16, 1886 |
| 483,468 | Morris | Sept. 27, 1892 |
| 752,043 | Coughenour | Feb. 16, 1904 |
| 790,003 | Ritzenthaler | May 16, 1905 |
| 809,437 | Finney | Jan. 9, 1906 |
| 1,473,953 | Dart | Nov. 13, 1923 |
| 1,620,985 | Standlee | Mar. 15, 1927 |
| 2,316,031 | Vogt | Apr. 6, 1943 |
| 2,338,353 | Perkins | Jan. 4, 1944 |
| 2,464,542 | Zarrs | Mar. 15, 1949 |
| 2,474,463 | Burrell | June 28, 1949 |
| 2,479,710 | Arnold | Aug. 23, 1949 |
| 2,569,780 | Rogers et al. | Oct. 2, 1951 |
| 2,578,045 | Conrad et al. | Dec. 11, 1951 |

FOREIGN PATENTS

| 469,464 | Germany | Dec. 14, 1928 |